June 9, 1964 J. R. COLE ETAL 3,136,896

POWER PULSE GENERATOR

Filed June 23, 1960

INVENTORS
JIMMY R. COLE
LARRY NEWLIN

BY William J. Miller

ATTORNEY

United States Patent Office 3,136,896
Patented June 9, 1964

3,136,896
POWER PULSE GENERATOR

Jimmy Ray Cole and Larry Newlin, Ponca City, Okla., assignors to Continental Oil Company, Ponca City, Okla., a corporation of Delaware Filed June 23, 1960, Ser. No. 38,198
3 Claims. (Cl. 307—88.5)

This application relates to a high power pulse generator for driving a low impedance load with a pulse of short duration and low repetition rate. This invention deals particularly with the application of silicon controlled rectifiers in a high power pulse generator.

The usual method of operating silicon controlled rectifier pulse circuits is to place a silicon controlled rectifier in a normally nonconductive state in series with the load with a trigger input connected to the control electrode of the rectifier. A second silicon controlled rectifier is capacitively coupled to the load and is maintained in a conductive condition by applying a portion of the power supply voltage through a resistor to the anode of the second silicon controlled rectifier. This circuit, however, is extremely wasteful of power since it is necessary to maintain the second controlled rectifier in a conductive condition. The series resistor between the source of supply and the anode of the conducting rectifier must be low if the time constant of the circuit is to remain short. Thus, a heavy current will flow through this resistor creating a wasteful power situation. Further, the power dissipation required of the resistor becomes prohibitively large, approximately 1300 watts, when a pulse of approximately 50 microseconds is desired. The circuit will also require a silicon controlled rectifier capable of handling approximately 16 amps. The use of heat sinks for the large rectifier capacity is obviously also required.

Therefore, it is an object of this invention to provide a high power pulse generator using silicon controlled rectifiers in which both rectifiers are operated in a normally cut off state.

It is a further object of this invention to provide a high power pulse generator wherein the average current of the silicon controlled rectifier is extremely low.

It is a still further object of this invention to provide a novel method of accurately controlling the width of the output pulse.

This invention features a high power pulse generator having first and second silicon controlled rectifiers. The first silicon controlled rectifier is connected in series with the load and power supply. The input of the silicon controlled rectifier is connected to the output of a pulse transformer. The second silicon controlled rectifier has its anode capacitively coupled to the anode of the first silicon controlled rectifier. In parallel with the capacitor is a second source of voltage and resistor serially connected. The controlled electrode of the second silicon controlled rectifier is connected to the output of a second pulse transformer having an opposite polarity to the first pulse transformer so that when a single square wave signal is applied to the primary of both pulse transformers, opposite pulse type output signals will be applied to the inputs of the silicon controlled rectifiers. The first positive appearing pulse caused by the leading edge of the square wave will cause the first silicon controlled rectifier to conduct, lowering the voltage at its anode to substantially ground potential, thereby applying the supply voltage across the load. The voltage of the coupling capacitor is likewise lowered to ground potential at this junction. When the trailing edge of the input pulse applies a positive output pulse from the second pulse transformer, the second silicon controlled rectifier will conduct simultaneously lowering its anode to substantially ground potential. Since the coupling capacitor is supplied with a second source of voltage, and since its remaining side is now lowered to ground potential, the original side will be lowered to a negative potential substantially equal to the potential of the second source of voltage. This will drive the anode of the first silicon controlled rectifier to a negative voltage which is sufficient to cause cut off of the first silicon controlled rectifier, thereby cutting off the current through the load and permitting the coupling capacitor to recharge. When the discharging current reduces to the point where insufficient current is passing through the second silicon controlled rectifier it will likewise cut off, thereby permitting the capacitor to recharge, allowing the circuit to return to its original operating state.

A more detailed explanation of the pulse generator circuit, along with other objects and features, is given when reference is made to the following description and accompanying drawings, in which.

Figure 2:
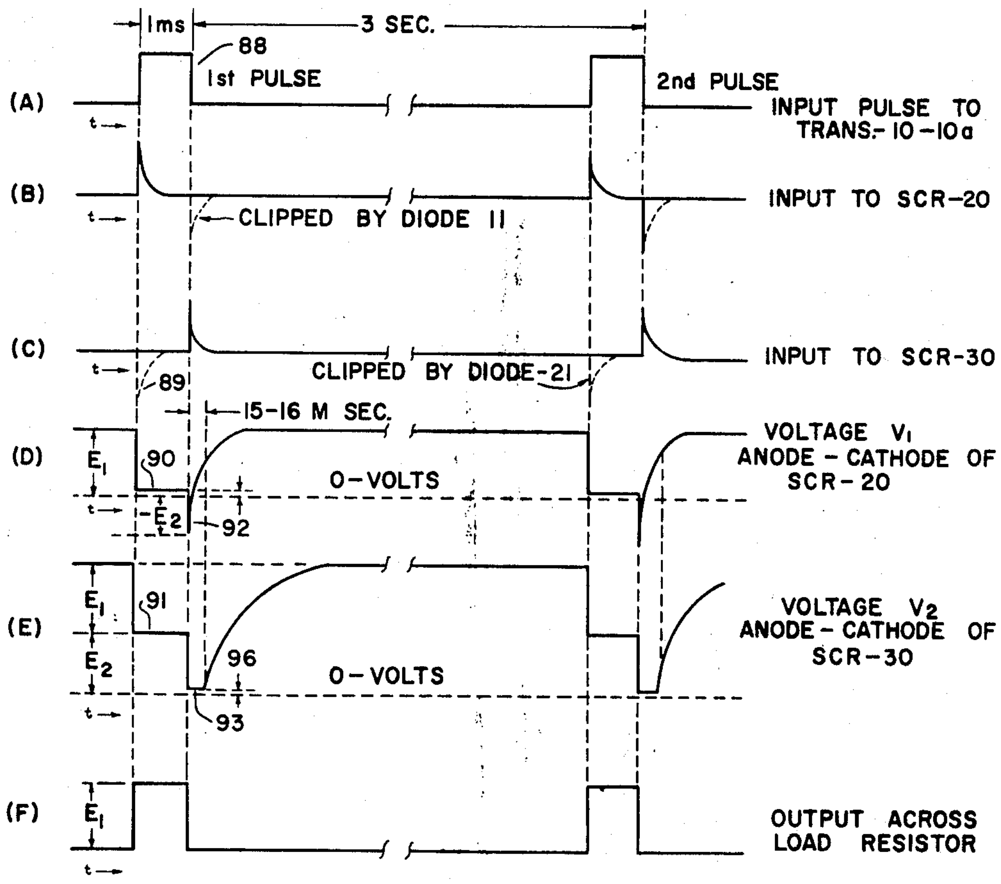
FIG. 2(*a*) is a wave form of the preferred input signal applied to the high power pulse amplifier.

FIGS. 2(*b*) and 2(*c*) are input signals as applied to the silicon controlled rectifiers;

FIGS. 2(*d*) and 2(*e*) show the variation in each of the anode potentials of the first and second silicon controlled rectifiers, respectively; and FIG. 2(*f*) shows the output pulse across the load.

Figure 1:
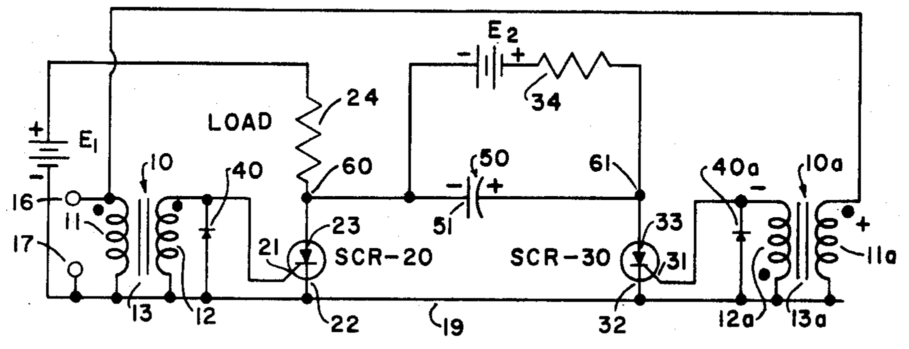
FIG. 1 is a schematic diagram of the high power pulse amplifier.

Referring to FIG. 1, the input of the pulse generator comprises a pair of pulse transformers 10 and 10*a* each having a primary winding 11, secondary winding 12, and a core 13. The input windings 11 and 11*a* are connected in parallel to a pair of input terminals 16 and 17. Primary windings 11 and 11*a* of transformers 10 and 10*a* are phased in the same direction with respect to an input signal at input terminals 16 and 17, while output windings 12 and 12*a* are oppositely phased with respect to their corresponding primary windings. Thus the output signals from transformers 10 and 10*a* will be opposite in phase from each other. A pair of silicon controlled rectifiers (SCR) 20 and 30 have their control elements 21, 31, and cathodes 22, 32 connected across the secondaries 12 and 12*a* of transformers 10 and 10*a*, respectively. A diode 40 is connected in parallel with secondary winding 12 and poled to shunt any negative output signals to the common lead or ground 19. An anode 23 of SCR20 is serially connected through a load resistor 24 and, a power source $E_1$ to cathode 22. A second diode 40*a* is also connected in parallel with secondary winding 12*a* and poled to shunt negative signal output signals to common lead 19. A relatively large capacity condenser 50 connects anode 33 of SCR30 to anode 23 of SCR20. Shunting capacitor 50 is a charging resistor 34 and a second source of power $E_2$. Both power supplies $E_1$ and $E_2$ are poled such that a positive voltage will be applied to the anodes 23 and 33 of SCR20 and SCR30, respectively.

In operation, prior to the application of a pulse at the input terminals 16 and 17, both SCR20 and SCR30 are in a nonconductive state. The voltage, therefore, appearing at the anode of SCR20 would be the potential of $E_1$, see FIG. 2(*d*), while the potential appearing on the anode of SCR30 would be the potential of $E_1+E_2$. Thus, if the potential of $E_1$ is approximately 80 volts and the potential of $E_2$ is approximately 67.5 volts the potential at anode 23 will be 80 volts and the potential of anode 33 will be 147.5 volts. Since the impedance of SCR20 during the cut off stage is extremely high, the voltage drop across load resistor 24 is negligible and the output voltage therefore would be zero. Under normal operation a narrow pulse having low repetition rate, such as shown in FIG. 2(*a*), is applied to the input terminals 16 and 17 and to the primaries 11 and 11*a* of pulse transformers 10 and 10*a*, respectively. Secondary 12 of pulse transformer 10 will form a positive going output pulse in time synchronism with the rise in voltage of the input square wave signal, FIG. 2(*b*). When the square wave signal drops back to zero a negative pulse will be formed in time synchronism with the voltage drop. However, diode 40 is poled to shunt the negative pulse to the common lead 19; thus the negative pulse is substantially clipped at the reference voltage level. A single positive pulse is, therefore, formed in time synchronism with the rise time of the square wave and is applied between the control element 21 and cathode 22 of nonconductive SCR20. The increase in positive bias will cause SCR20 to instantly conduct and drop the voltage at junction 60 to substantially ground or reference voltage level and will cause the current to increase through load 24. Thus, referring to FIG. 2(*d*), the anode drops from a voltage $E_1$ to a value indicated by numeral 90 which is substantially reference level and remains there until SCR20 is rendered nonconductive by subsequent operation of SCR30. Since junction 60 is lowered to reference voltage, plate 51 of capacitor 50 is also lowered to reference or ground potential. The drop in voltage will cause the anode voltage of SCR30, FIG. 2(*e*), to drop from a voltage $E_1+E_2$ to a value indicated by numeral 91 which is equal to $E_2$. Potential $E_g$ will be maintained at the anode 33 and junction 61 until the trailing edge of the input pulse 89, FIG. 2(*a*), causes SCR20 to be rendered nonconductive.

When the input pulse was applied to the primary 11 of transformer 10 it was also simultaneously applied to primary 11*a* of pulse transformer 10*a*. The output pulse, however, was opposite in polarity since the secondary 12*a* was oppositely poled from primary 11*a* and primary 11. Therefore, while pulse transformer 10 puts out a positive pulse with the leading edge of the input square wave 88, pulse transformer 10*a* puts out a negative pulse 89, FIG. 2(*c*), in time synchronism with the rise of the leading edge of pulse 89. However, diode 40*a* was poled to clip a negative appearing pulse at the output of secondary 12*a*. Thus, the output as applied between the control element 31 and cathode 32 of SCR30 is zero maintaining SCR30 in a nonconductive state. When square wave 88 dropped in voltage, a positive voltage was generated at the output of primary 12*a*. This positive voltage is applied between control element 31 and cathode 32 of SCR30 and renders SCR30 conductive. The decrease in impedance between the anode and cathode of SCR30 lowers junction 61 to a potential 93, FIG. 2(*e*), which is substantially ground potential. This reduction in potential causes capacitor 50 to discharge through SCR30 resulting in a negative potential 92, FIG. 2(*d*), between anode 23 and cathode 22 of SCR20. Capacitor 50 continues to discharge through SCR30, power supply $E_1$, and load 24. The SCR20 will be cut off by the discharge of current from the capacitor 50 and gradually raise the potential of the anode, during a period of approximately 15 to 16 microseconds, to its original value of $E_1$. The drop in anode voltage 93, FIG. 2(*e*), of SCR30 will also cause a reduction of the current of SCR30 between its anode 31 and cathode 32. This reduction in current will tend to cut off SCR30. As the capacitor 50 begins to recharge and SCR20 begins to approach its original state of nonconduction the voltage at junction 61 will approach its original potential of $E_1+E_2$.

A variation in the rise time of the potential of junction 61 can be obtained by a variation in the coupling capacitor 50 and resistor 34. However, the value must be sufficiently large to reduce the current through $E_2$ sufficiently that it will be rendered nonconductive.

The output pulse across load resistor 24 will be identical with the input pulse since the current through load 24 is turned on by switching on SCR20 and is turned off by switching on SCR30.

Thus, a very small magnitude square wave applied to the input terminals 16 and 17 can control a large current flow by the novel trigger circuit above explained. A trigger circuit embodying the above components has been constructed and the components incorporated therein are as follows:

(1) SCR20 and SCR30 are silicon controlled rectifier elements part number 635B.[1]
(2) Capacitor 50—ten microfarad.
(3) Resistor 34—20,000 ohm.
(4) Load resistor 24—approximately 2 ohms.
(5) Battery $E_1$—80 volts.
(6) Battery $E_2$—67.5 volts.
(7) Diodes 40 and 40*a*—type F6.[2]
(8) Pulse transformers 10 and 10*a*—turns ratio 1:1, type H–57.[3]

[1] Manufactured by General Electric Company, Liverpool, New York.
[2] Manufactured by Sarkes Tarzian, Bloomington, Indiana, U.S.A.
[3] Manufactured by United Transformer Corporation, New York City, U.S.A.

The above components and their values are listed by way of example only, and the scope of the invention is not so limited that other componetns cannot be substituted within the meaning and scope of this invention.

Thus, a circuit has been described which provides for the formation of extremely narrow pulses having a tremendous power amplification over the input signal. The circuit further does not have the faults inherent in previous pulse generating circuits which require a continuously conducting silicon controlled rectifier. It is also with the intent and scope of this invention that other forms of trigger circuits can be embodied in place of the pulse transformers herein described, for example, multivibrators and the like.

Although this invention has been described with respect to particular embodiments thereof, it is not to be so limited, as changes and modifications may be made therein which are within the spirit and scope of the invention as defined by the appended claims.

What we claim is:

1. In an apparatus for generating pulses of the type which includes first and second silicon controlled rectifiers, each of which contains an anode, a cathode, and a control element; a first power supply and load serially connected between the anode and cathode of said first silicon controlled rectifiers; a first input means connected between the control element and cathode of said first silicon controlled rectifier; a second input means connected between the control element and cathode of said second silicon controlled rectifier; and capacitor means connected between the anode of said first silicon controlled rectifier and the anode of said second silicon controlled rectifier, the improvement comprising: a second source of supply; a second resistive means serially connected to said second source of supply, said second source of supply and said resistor means shunting said capacitor means, whereby said second silicon controlled rectifier is maintained in a normally nonconductive state until the application of said switching pulse, thereby substantially reducing the component size and the power consumed in said circuit.

2. An apparatus for generating a high power pulse comprising an input; first and second controlled rectifiers, each having at least an anode, a cathode, and a control element, means connecting said input to the cathode and control element of said first silicon controlled rectifier; a first power generating means, a load, means serially connecting said load with said first power generating means, means serially connecting said serially connected first power generating means and said load between the anode and cathode of said first silicon controlled rectifier, a phase reversal means connected from said input to the control element and cathode of said second controlled rectifier, a capacitor means connected between each of said anodes, and a second voltage source and a resistive means serially connected together and in shunt with said capacitor means, said first and second source of power poled to apply the same polarity to the anode of said first and second controlled rectifiers, respectively.

3. An apparatus for generating a high power pulse comprising an input; first and second control rectifiers each having at least an anode, a cathode and control element; first and second pulse transformers, each having at least a primary and a secondary; each of said primaries connected to said input; the secondary of said first pulse transformer connected between the control element and cathode of said first control rectifier, the secondary of said second pulse transformer poled opposite from the secondary of said first pulse transformer and connected between the control element and cathode of said second controlled rectifier; a first voltage source; a load serially connected with said first voltage source; means serially connecting said serially connected first voltage source and said load between the anode and cathode of said first controlled rectifier; capacitor means connected between each of said anodes; a second voltage source and a resistive means serially connected together and in shunt with said capacitor means, said first and second voltage source poled to apply the same potential to the anode of said first and second controlled rectifiers, respectively.

References Cited in the file of this patent

UNITED STATES PATENTS 2,691,158 Wittenberg -------------- Oct. 5, 1954

OTHER REFERENCES

"A Survey of Some Circuit Applications of the Silicon Controlled Switch and Silicon Controlled Rectifier"—Bulletin D420–02, August 1959, by Solid State Products, Inc., 1 Pingee St., Salem, Mass., pages 7 and 8 relied on.